United States Patent Office 3,413,473
Patented Nov. 26, 1968

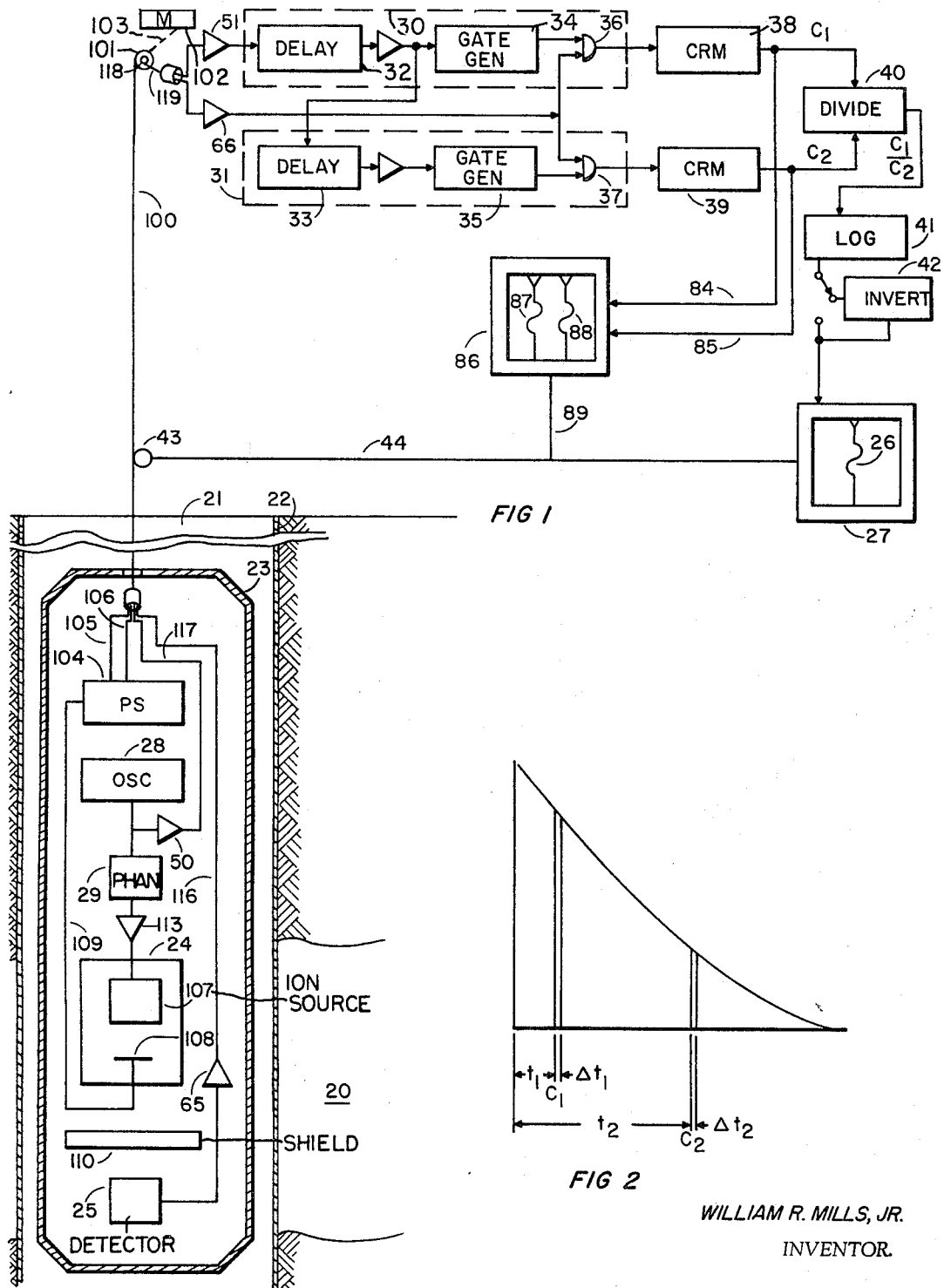

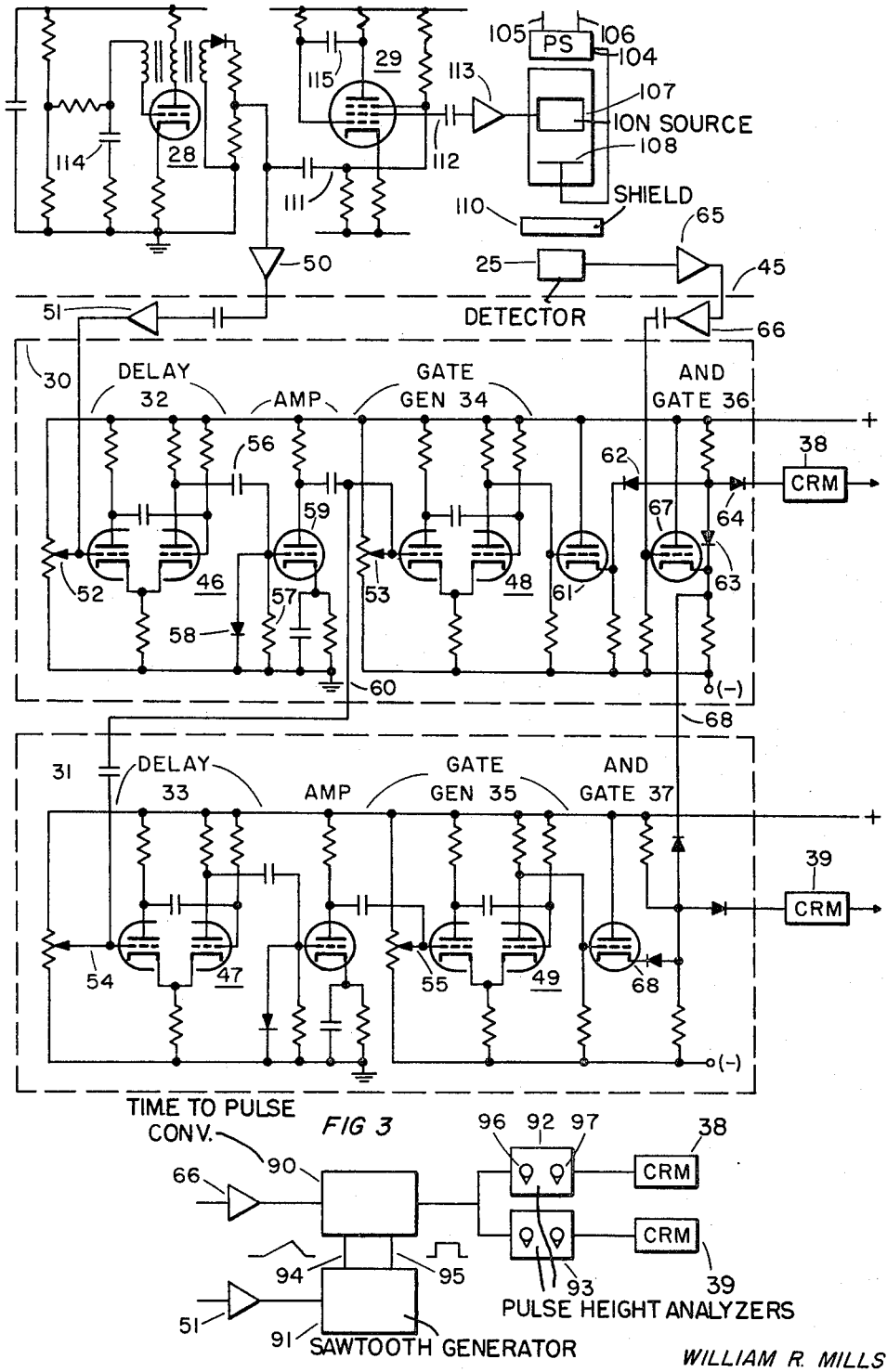

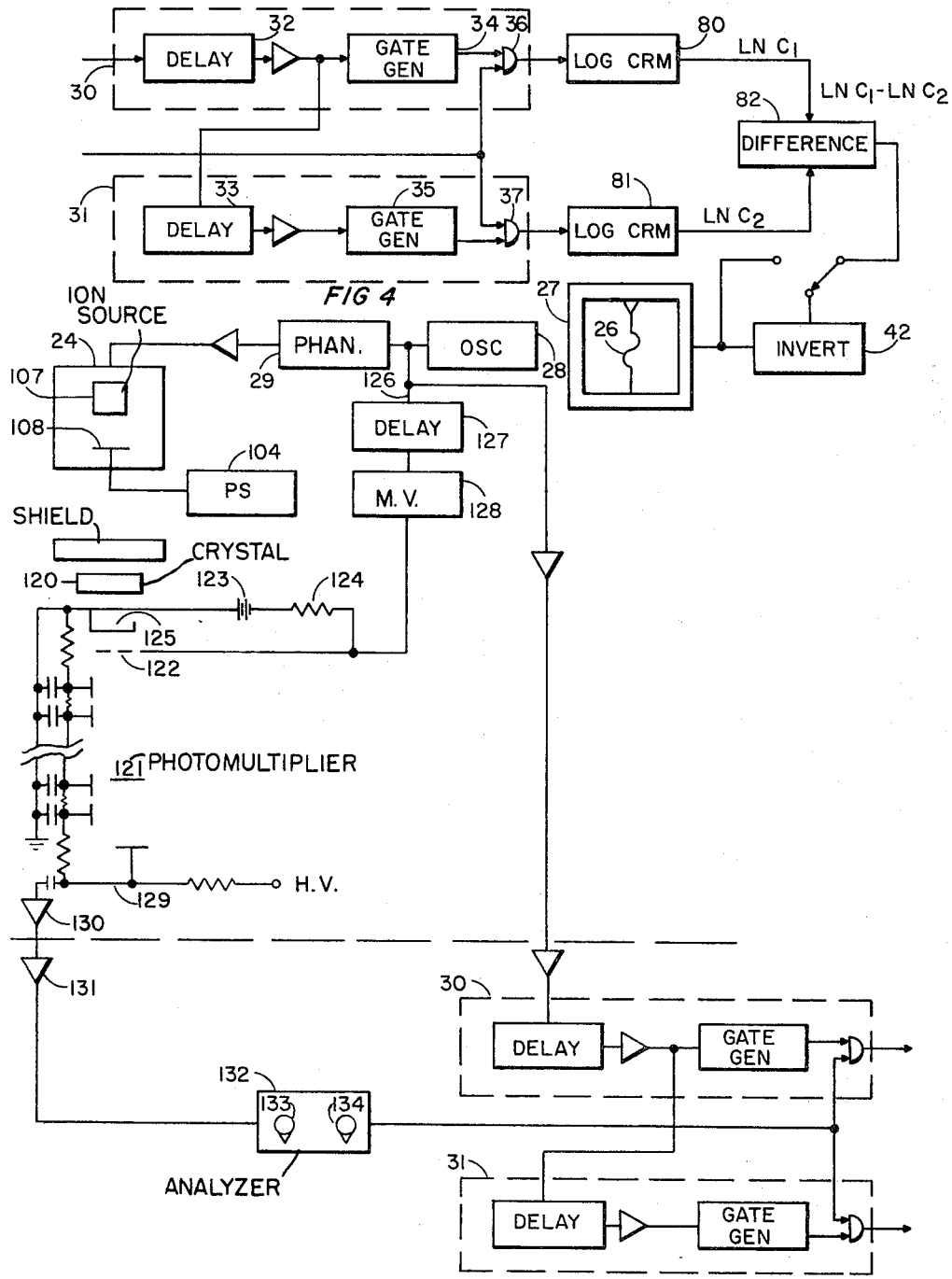

3,413,473
RADIATION MEASURING SYSTEM
William R. Mills, Jr., Dallas, Tex., assignor to Mobil Oil Corporation, a corporation of New York
Filed Nov. 29, 1963, Ser. No. 326,791
4 Claims. (Cl. 250—83.3)

This invention relates to the measurement of decay, growth, and lifetime of radiation or of radioisotopes formed and more particularly to the automatic production of a function indicative of such quantities and has for an object a radioactive well logging system for producing continuously and in correlation with depth a function representative of decay or lifetime of secondary radiation or of radioisotopes formed by the irradiation of formations traversed by a borehole.

In radioactive analysis the quantities, the decay constant, the mean life, or the half life are determined to identify unknown elements. For example, in radioactive well logging a measurement of the mean life of thermal neutrons gives an indication of the salinity of formations.

In accordance with the present invention, there is provided a radioactive well logging system for measuring automatically quantities of interest, such as the decay constant or mean life, thereby reducing the cost of the investigation of formations of interest. More particularly, the system performs the operations of passing along a borehole a source of primary radiation and irradiating the formations with pulses of primary radiation spaced in time for the production of secondary radiation. At a location in the borehole spaced from the source secondary radiation passing from the formations into the borehole is detected. A first set of functions is generated for controlling the time of occurrence of first and second time periods following each pulse of primary radiation. In response to the secondary radiation detected, there is generated a second set of functions respectively representative of secondary radiation detected within the first and second time periods following each of a plurality of pulses of primary radiation. The relationship between the functions representative of secondary radiation detected within the first and second time periods is indicative of the quantity of interest. From the varying relationship there is derived a function representative of this quantity of interest such as the decay constant or mean life.

The system of carrying out the foregoing operation comprises a borehole unit including a radioactive source for irradiating the formations with pulses of primary radiation spaced in time for the production of secondary radiation. In addition, there is provided a detector for detecting secondary radiation passing from the formations into the borehole. Gating means is provided for generating a first set of functions for controlling the time of occurrence of first and second time periods following each pulse of primary radiation. Means responsive to the secondary radiation detected generates a second set of functions representative of the secondary radiation detected within the first and second time periods following each of a plurality of pulses of primary radiation. A control means produces an output representing the desired relationship between the functions representing secondary radiation within the first and second time periods. In addition, means is provided for deriving from the varying relationship a function representative of the quantity of interest, such as the decay constant or mean life.

In a more specific aspect, the control means produces an output representative of the logarithm of the ratio of the functions comprising the second set of functions.

In one embodiment, the above system produces a continuous function in correlation with depth and representative of the decay constant or mean life of radiation detected or radioisotopes formed in the formations as the result of the irradiation with primary radiation. The source may be a neutron source and the detector a thermal neutron detector employed to produce a function representative of the decay constant or mean life of thermal neutrons.

For further objects and advantages of the present invention and for a more complete understanding thereof, reference may now be had to the following detailed description taken in conjunction with the accompanying drawings wherein:

FIGURE 1 represents a system for investigating the elements in the formations traversed by a borehole;

FIGURE 2 is a decay curve useful in understanding the present invention;

FIGURE 3 illustrates the circuitry employed in the system of FIGURE 1;

FIGURE 4 is a modification of the system of FIGURE 1;

FIGURE 5 is a further modification of the system of FIGURE 1; and

FIGURE 6 illustrates a system which may be employed in the well logging system of FIGURE 1 to detect and measure gamma radiation.

Referring now to FIGURE 1 of the drawings, there will be described the method and system of the present invention for measuring automatically the decay or lifetime of radiation or of radioisotopes in order to identify unknown elements in the formations. In this illustration, the unknown elements of interest are those, for example, in formation 20 traversed by a borehole 21 line with casing 22. In carrying out the method, the formations are irradiated with pulses or bursts of primary radiation, spaced in time, for the production of secondary radiation which is detected in the borehole. The system for carrying out these operations includes a borehole tool or logging instrument 23 containing a source 24 for irradiating the formations with pulses or bursts of primary radiation and a detector 25 for detecting secondary radiation passing from the formations into the borehole. The output of detector 25 is applied to the surface where measurements are obtained of the secondary radiation detected at least during two time periods following each pulse of primary radiation. From these two measurements a continuous trace 26 in correlation with depth is produced by recorder 27 and directly displays the decay constant or mean life of radiation or radioisotopes under investigation.

In radiation measurements such as in well logging, it is desirable to determine the rate of decay or decay constant from at least two measurements made within two time periods after each pulse of radiation. This is due to the fact that the rate of decay or decay constant as obtained from two such measurements is independent of the fluctuation of the output of the primary radiation source. By automatically and directly determining the decay constant from two such measurements, improved measurements can be obtained in a minimum of time, thereby reducing the cost of a survey.

More particularly, referring to FIGURE 2 of the drawings, the measurements obtained during the two time periods following each pulse of primary radiation may be expressed by the following equations:

$$C_1 = C_0 \tau \left(1 - e^{-\frac{\Delta t_1}{\tau}}\right) e^{-\frac{t_1}{\tau}} \quad (1)$$

and $$C_2 = C_0 \tau \left(1 - e^{-\frac{\Delta t_2}{\tau}}\right) e^{-\frac{t_2}{\tau}} \quad (2)$$

wherein:

$C_1$ and $C_2$ are the cumulative counts observed respectively within the two time periods $\Delta t_1$ and $\Delta t_2$ over a plurality of cycles;

$C_0$ represents the counting rate (counts per unit time) at time zero for the same number of cycles;

$t_1$ and $t_2$ are the time intervals following time zero at which $\Delta t_1$ and $\Delta t_2$ begin; and $\tau$ is the mean life of the radiation detected or of the radioisotopes formed.

From Equations 1 and 2 the following relationship may be derived for the case where $\Delta t_1$ and $\Delta t_2$ are equal:

$$\tau = \frac{t_2 - t_1}{\ln \frac{C_1}{C_2}} = \lambda \tag{3}$$

wherein:

ln is the natural logarithm; and
$\lambda$ is the decay constant.

In the embodiment disclosed, the mean life $\tau$ or the decay constant $\lambda$ is obtained by maintaining constant $t_2 - t_1$, and producing a function representative of the variation of ln $C_1/C_2$. From this function trace 26 is produced which is representative of the variation of $\tau$ or $\lambda$.

In one embodiment of the present invention, the trace 26 reflects the variation of the decay constant $\lambda$ or mean life $\tau$ of thermal neutrons in the formations and is employed to differentiate between oil- and salt-water-bearing formations. More particularly, the formations are irradiated with pulses of fast neutrons for the production of thermal neutrons. The thermal neutrons formed diffuse in the formations until they are captured while others pass into the borehole and are detected. The rate of decay or capture of thermal neutrons as reflected by trace 26 is indicative of the thermal neutron-capture cross section of the elements present. The variation of the trace 26 thus gives an indication of the nature of the elements present in the formations. For example, if salt water instead of oil is present in the formations irradiated, the trace 26 will reflect an increase in the rate of capture or decay of thermal neutrons. This is due to the fact that chlorine in the salt water has a much larger capture cross section for thermal neutrons than do the constituents of oil.

Referring again to FIGURE 1, the system for automatically measuring $\tau$ or $\lambda$ now will be described in more detail. In the measurement of thermal neutrons, source 24 employed is a pulsed neutron source and detector 25 is a thermal neutron detector. An oscillator 28 is employed in the borehole tool 23 periodically to generate trigger pulses. These pulses trigger a phantastron 29 for the production of electrical pulses of a desired duration to actuate the neutron source 24 for the production of bursts or pulses of neutrons. The trigger pulses from oscillator 28 also are applied to trigger the uphole instrumentation which comprises the systems illustrated by the dotted lines 30 and 31. Systems 30 and 31 select pulses from the detector 25 which are representative respectively of the counts $C_1$ and $C_2$ and hence of the radiation detected respectively within time periods $\Delta t_1$ and $\Delta t_2$. More particularly, systems 30 and 31 comprise respectively delay circuits 32 and 33, gate generators 34 and 35, and positive "AND" gates 36 and 37. Periodically, the trigger pulses from the borehole unit are applied to delay circuit 32 for the production of a trigger pulse at $t_1$. This pulse is applied to trigger gate generator 34 for the production of a pulse to open gate 36 for a time period equal to $\Delta t_1$. The trigger pulse produced from delay circuit 32 also is applied to delay circuit 33 for the production of a trigger pulse at $t_2$. This pulse is applied to trigger gate generator 35 to open gate 37 during the time period $\Delta t_2$. During $\Delta t_1$ and $\Delta t_2$ pulses from the detector 25 are allowed to pass gates 36 and 37 to count rate meters 38 and 39 for the production of a set of functions representative of the intensity of radiation detected during $\Delta t_1$ and $\Delta t_2$. The output of meter 38 is divided at circuit 40 by the output of meter 39. A function representative of the logarithm of $C_1/C_2$ is obtained at 41, inverted at 42, and applied to recorder 27 for the production, in correlation with depth, of a trace representative of $\tau$. The chart of recorder 27 is driven in correlation with depth by measuring element 43 and mechanical connection 44. If it is desired to record $\lambda$, the output function of circuit 41 is directly applied to recorder 27.

Referring now to FIGURE 3, there will be described in detail the circuitry of the system. The system above the dotted line 45 represents the borehole instrumentation and the system below the dotted line 45 represents the surface instrumentation. Delay circuits 32 and 33 respectively comprise cathode-coupled monostable multivibrators 46 and 47 coupled to differentiating and clipping circuits. Gate generators 34 and 35 also comprise cathode-coupled monostable multivibrators 48 and 49. At the onset, the left stages of multivibrators 46–49 are off and the right stages are conducting. Under these conditions, positive pulses are produced at the plates of the right stages when the multivibrators are triggered. The voltages at the grids of the left stages of multivibrators 46 and 47 control the width of the pulses produced by the right stages. The width of these pulses in turn determine or control $t_1$ and $t_2$, the time of occurrence of $\Delta t_1$ and $\Delta t_2$. In addition, the width of the pulses produced by multivibrators 48 and 49 determine the width of $\Delta t_1$ and $\Delta t_2$. In the system disclosed in FIGURE 3, the time intervals $t_1$ and $t_2$ and time periods $\Delta t_1$ and $\Delta t_2$ are maintained constant during logging operations; however, they may be adjusted prior to logging to desired values by adjustment of potentiometer arms 52–55 to vary the voltage applied to the grids of the left stages as can be understood by those skilled in the art.

Referring particularly to system 30, pulses from oscillator 28 of the borehole unit are amplified at 50 and 51 for the production of positive pulses which are applied to trigger multivibrator 46. The positive pulse from the right stage of multivibrator 46 is differentiated at 56 and 57 with the leading positive peak being clipped at 58. The trailing negative peak is amplified and inverted at 59 for the production of a trigger pulse at $t_1$ which as applied to trigger monostable multivibrator 48. The output of amplifier 59 also is applied by way of conductor 60 to trigger monostable multivibrator 47, as will be described hereinafter. The positive pulse from the right stage of multivibrator 48 is applied by way of cathode follower 61 to open "AND" gate 36 which comprises diodes 62–64. The pulses from detector 25 are applied to "AND" gate 36 by way of amplifiers 65 and 66 and cathode follower 67.

System 31 is similar to system 30 with the following exceptions. As mentioned previously, the output of amplifier 59 is applied by way of conductor 60 to trigger monostable multivibrator 47. The detector pulses from detector 25 are applied to "AND" gate 37 by way of cathode follower 67 and conductor 68.

If count rate meters 38 and 39 are of the type which require negative input pulses, the outputs of gates 36 and 37 may be inverted by means (not shown) prior to the application thereof to meters 38 and 39.

In the above-described system, $\lambda$ or $\tau$ was recorded automatically by first obtaining a function representative of $C_1/C_2$ and then the logarithm of this function; however, it is to be understood that $\lambda$ or $\tau$ also may be determined from a function produced and representative of the variation of the relationship ln $C_1$–ln $C_2$. A system for measuring $\lambda$ or $\tau$ by measuring ln $C_1$–ln $C_2$ is illustrated in FIGURE 4. In this system, the output of "AND" gates 36 and 37 are applied respectively to log count rate meters 80 and 81 which produce functions representative of the logarithm of the intensity of radiation detected respectively within $\Delta t_1$ and $\Delta t_2$. The outputs of count rate meters or circuits 80 and 81 are applied to a difference circuit 82 for obtaining $\ln C_1 - \ln C_2$. The output of difference circuit 82 is applied to recorder 27 for the determination of $\lambda$ or inverted for the determination of $\tau$ as described previously.

In the operations as described above, the quantities, such as the decay constant or mean life, preferably were obtained automatically and in the field while logging. It is to be understood, however, that the automatic determination of these quantities can be carried out in the laboratory from logs obtained in the field. More particularly, referring again to FIGURE 1, the output of count rate meters 38 and 39 may be applied by way of conductors 84 and 85 to a dual pen recorder 86 for the production of two curves 87 and 88 representative of the intensity of radiation detected respectively within $\Delta t_1$ and $\Delta t_2$. The chart of recorder 86 also is driven in correlation with depth by measuring element 43, mechanical connection 44, and connection 89. The logs obtained by recorder 86 may be taken to the laboratory and suitable equipment employed to trace the curves to obtain voltage functions representative of the variation thereof with depth. These functions may be applied, for example, to circuits 80–82 to automatically determine $\lambda$ or $\tau$.

In the above-described system of FIGURE 1, the two selecting systems 30 and 31 comprise two "AND" gates 36 and 37 for selecting radiation within two separate time periods. There now will be described another system which may be employed to carry out the same operations. More particularly, referring to FIGURE 5, this system comprises a time-to-pulse height converter 90, sawtooth wave and gate pulse generator 91 actuated by trigger pulses applied from amplifier 51, and two single-channel pulse height analyzers 92 and 93. The time-to-pulse height converter 90 produces pulses having heights proportional to the time that radiation is detected following the beginning of the saw-tooth wave for each cycle. These pulses are selected according to height by analyzers 92 and 93 to select radiation detected respectively within $\Delta t_1$ and $\Delta t_2$.

In the operation of the system, a saw-tooth or time-varying voltage from the generator 91, which may be a type 531 Tektronix oscilloscope, is applied to the converter 90 by way of conductor 94. This saw-tooth voltage may be generated substantially during the entire period within each pulse of irradiation. The amplitude of the saw-tooth voltage applied to converter 90 is sampled by sampling pulses, which are the detector pulses applied by way of amplifier 66. The time-to-pulse height converter 90 may be of the type described in "Time-to-Pulse Height Converter of Wide Range" by Joachim Fischer and Arne Lundby, The Review of Scientific Instruments, volume 31, Number 1, Jan. 1960. As described in the above-mentioned article, a gate is employed for accepting sampling pulses only during the rising part of the saw-tooth voltage. This gate is open only during this time by a positive gate pulse applied thereto by way of conductor 95 and available from the plus (+) gate of the oscilloscope. The output of the converter 90 comprises pulses having magnitudes proportional to that of the saw-tooth voltage at the time of sampling. These output pulses thus have a magnitude proportional to time referred to the start of the saw-tooth voltage as time zero. To select detector pulses which appear within the time periods $\Delta t_1$ and $\Delta t_2$, the pulse height analyzers 92 and 93 are adjusted to be responsive to pulses from the converter 90 which have certain magnitudes. For example, in the operation of analyzer 92, the adjustment is accomplished by varying the threshold control 96 and the window width control 97. Analyzer 93 is adjusted in a similar manner to be responsive only to pulses within $\Delta t_2$. In some instances it may be desirable to delay the start of the saw-tooth voltage following the start of each trigger pulse from amplifier 51. This can be done by inserting a delay circuit (not shown) between amplifier 51 and saw-tooth generator 91.

Now that there have been described several embodiments for continuously and automatically measuring $\lambda$ or $\tau$, there will be described other components and modifications of the well logging system. More particularly, referring again to FIGURE 1, it can be seen that the logging instrument 23 is supported in the borehole by a cable 100 which is wound and unwound upon a drum 101. A motor 102 drives the drum 101 by way of mechanical connection 103 to move the instrument 23 along the borehole at a rate which may be of the order of 25 feet per minute. A power supply 104 is provided in the instrument 23 for supplying power to all of the components of the tool, although it is illustrated as being coupled to the source 24. Conductors 105 and 106, which pass through cable 100, are provided for supplying energizing current to power supply 104.

The neutron source 24 comprises an ion source 107 of deuterium and a target 108 of tritium. Trigger pulses of positive polarity periodically are applied to the deuterium ion source 107 for ionizing the deuterium. The deuterium ions produced are accelerated to the target 108 by a high negative voltage applied thereto from power supply 104 and conductor 109. The reaction between the deuterium ions and the tritium produces bursts or pulses of neutrons of energy 14.3 mev. which then irradiate the adjacent formations. The detector 25 may be shielded from direct radiation from source 24 by shield 110.

The pulses for ionizing the deuterium are obtained from blocking oscillator 28 and phantastron 29. More particularly, the blocking oscillator produces sharp trigger pulses which are applied by way of conductor 111 (FIGURE 3) to trigger phantastron 29. The phantastron produces pulses of predetermined width which are applied by way of conductor 112 and amplifier 113 to ion source 107. The frequency and width of the pulses applied to the ion source may be varied by varying the values of capacitors 114 and 115 respectively of oscillator 28 and phantastron 29 as understood by those skilled in the art. If thermal neutron lifetime is being measured, the repetition rate of the neutron pulses may be of the order of 200–500 pulses per second, the width of each pulse being of the order of 50–100 microseconds. Within these limits $\Delta t_1$ and $\Delta t_2$ may be of the order of 100 microseconds, with $t_1$ being of the order of 800 microseconds and $t_2$ being of the order of 1200 microseconds after the end of each pulse of neutrons.

The outputs of detector 25 and oscillator 28 are applied to the surface respectively by way of amplifiers 65 and 50 and conductors 116 and 117 (FIGURE 1) which pass to the surface through cable 100. At the surface, pulses are taken from conductors 116 and 117 by way of a plurality of slip rings and brushes illustrated at 118 and 119. At the surface, the trigger and detector pulses are applied to the measuring system respectively by way of amplifiers 51 and 66 as mentioned previously.

In the above system there was described the measurement of the decay constant or lifetime of thermal neutrons; however, it is to be understood that decay or lifetime measurements can be obtained of neutron-capture gamma rays or of radioisotopes formed from the elements irradiated with primary radiation. The lifetime of neutron-capture gamma rays varies in a similar manner to that of thermal neutrons as can be understood by those versed in the art and thus can be employed in a similar manner to obtain information about the presence or absence of oil. On the other hand, it may be desirable to measure delayed gamma rays emitted by short-lived radioisotopes to obtain specific information about the elements present in the formations. More particularly, referring to FIGURE 6, a gamma ray detecting system is provided which comprises a scintillation crystal 120 coupled to a photomultiplier tube 121. The photomultiplier tube 121 may be normally biased to cut off during the time that the neutron generator is pulsed to prevent the high intensity radiation present during this time from affecting the gain of the tube. After the end of each pulse of neutron radiation, the tube 121 is energized to an operative condition for the production of output pulses in response to the radiation detected by crystal 120. A negative potential, with respect to the cathode 125, normally is applied to the shield grid 122 to bias the tube to cut off. This potential is supplied by source 123 connected to resistor 124, both of which are coupled between the grid 122 and cathode 125. The trigger pulses produced by blocking oscillator 28 are utilized in the production of a positive voltage of a magnitude sufficient to overcome the bias on the tube 121. These trigger pulses are applied by way of conductor 126 to a delay circuit 127. The output of this circuit triggers a monostable multivibrator 128. When triggered, a positive pulse is produced by multivibrator 128 which is then applied to shield grid 122 to overcome the bias and render the tube 121 in an operative condition for a predetermined time period between each trigger pulse. The output pulses from the anode 129 of tube 121 have heights proportional to the energy of the gamma rays detected, and are applied by way of amplifiers 130 and 131 to a single-channel analyzer 132. This analyzer is adjusted by adjustment of threshold control 133 and window width control 134 to be responsive only to gamma rays detected within a desired energy range. The output of analyzer 132 then is applied to systems 30 and 31 for the production of the desired measurement which may be the decay constant or mean life of the radioisotope formed.

In one embodiment, the circuit 41 for forming the logarithm of a function may comprise a power supply, a 16.015 housing, a 16.032-1 Log $x$ Fixed Diode Function Generator; a 6.217-1 D.C. amplifier; and an adder and constant multiplier comprising 6.217-1 operational amplifiers, all available from Electronics Associates Inc., Long Branch, N.J. A suitable circuit 40 for dividing one function into another is disclosed on pp. 338 and 339 of Electronic Computers, Granino A. Korn and Theresa M. Korn, McGraw-Hill Book Company, Inc., New York, 1956. The neutron source 24 may be of the type manufactured by N. V. Philips, Gloeilampenfabrieken, Eindhoven, Holland, Model No. 285, distributed in the United States by Norelco, 750 S. Fulton Ave., Mount Vernon, N.Y. The difference circuit 82 may be of the type illustrated on p. 248 of Electron Tube Circuits, Samuel Sealey, McGraw-Hill Book Company, Inc., 1958, Second Edition. The log count rate meters 80 and 81 may be of the type manufactured by Victoreen Instrument Company, Cleveland, Ohio, Model No. CRM-3C. The pulse height analyzers 92 and 93 may be a dual unit of the type manufactured by Hamner Electronics Company, Inc., Princeton, N.J., Model No. N-602.

Now that the invention has been described, modifications will become apparent to those skilled in the art, and it is intended to cover such modifications as fall within the scope of the appended claims.

What is claimed is:

1. A well logging system for logging the formations traversed by a borehole comprising:
   a borehole unit movable through said borehole,
   a neutron source of primary radiation supported by said borehole unit for periodically irradiating the formations with pulses of primary radiation to produce secondary radiation from said formations,
   a detector supported by said borehole unit for detecting secondary radiation passing from said formations into said borehole,
   a selection circuit including:
      first and second gate generators,
      first and second gating circuits, the output of said detector being applied to said first and second gating circuits,
      means for actuating said first gate generator, the output of said first gate generator being applied to said first gating circuit to produce at the output thereof first signals representative of secondary radiation detected within a first time period following each pulse of primary radiation,
      means for actuating said second gate generator, the output of said second gate generator being applied to said second gating circuit to produce at the output thereof second signals representative of secondary radiation detected within a second time period following each pulse of primary radiation,
   means including a control circuit responsive to said first and second singals for producing an output representing the decay of said secondary radiation, and
   a recorder driven in correlation with the movement of said logging unit in said borehole, the output of said control circuit being applied to said recorder to continuously record while logging a log related to the decay of said secondary radiation detected as a function of the position of said logging unit in said borehole.

2. The system recited in claim 1 wherein said control circuit includes:
   a ratio circuit for producing an output representative of the ratio of the intensity of secondary radiation detected within said first and second time periods, and
   a logarithm circuit, the output of said ratio circut being applied to said logarithm circuit, said logarithm circuit producing an output which is a function of the logarithm of the output of said ratio circuit.

3. The system recited in claim 1 wherein said control circuit includes:
   first and second logarithm circuits responsive to said first and second signals respectively for producing first and second outputs representative of the logarithm of the intensity of secondary radiation detected within said first and second time periods respectively, and
   a difference circuit, the outputs of said first and second logarithm circuits being applied to said difference circuit to produce at the output thereof a signal which is a function of the difference between said first and second outputs.

4. A well logging system for logging the formations traversed by a borehole comprising:
   a borehole unit movable through said borehole,
   a neutron source of primary radiation supported by said borehole unit for periodically irradiating the formations with pulses of primary radiation to produce secondary radiation from said formations,
   a detector supported by said borehole unit for detecting secondary radiation passing from said formations into said borehole,
   a selection circuit including:
      first and second discriminating means,
      a time-to-pulse height converter, the output of said detector being applied to said time-to-pulse height converter, said time-to-pulse height converter producing an output of pulses having heights proportional to the time that secondary radiation is detected, the output of said time-to-pulse height converter being applied to said first and second discriminating means, said first and second discriminating means being selectively responsive to predetermined magnitudes of said pulses for producing at the outputs thereof first and second signals representative of secondary radiation detected within first and second time periods following each pulse of primary radiation,
   means including a control circuit responsive to said first and second signals for producing an output representative of the decay of said secondary radiation detected, and a recorder driven in correlation with the movement of said logging unit in said borehole, the output of said control circuit being applied to said recorder to continuously record while logging a log related to the decay of said secondary radiation detected as a function of the position of said logging unit in said borehole.

References Cited

UNITED STATES PATENTS

| 2,971,094 | 2/1961 | Tittle | 250—83.6 |
| 2,974,231 | 3/1961 | Greenblatt et al. | 250—83.3 |
| 3,058,057 | 10/1962 | Frost | 235—193 X |
| 3,133,195 | 5/1964 | Jones et al. | 250—83.6 |
| 3,164,720 | 1/1965 | Armistead | 250—83.6 |

OTHER REFERENCES

A. H. Youmans et al.: Neutron Lifetime, A New Log, published by Lane Wells, Oct. 9, 1963, pp. 3–13 relied on RALPH G. NILSON, *Primary Examiner.*

S. ELBAUM, *Assistant Examiner.*

UNITED STATES PATENT OFFICE
CERTIFICATE OF CORRECTION

Patent No. 3,413,473                                  November 26, 1968

William R. Mills, Jr.

It is certified that error appears in the above identified patent and that said Letters Patent are hereby corrected as shown below:

Column 1, line 21, before "formations" insert -- the --. Column 2, line 33, "line" should read -- lined --. Column 3, line 15, the right-hand portion of equation (3) reading $$= \lambda \qquad \text{should read} \qquad = \frac{1}{\lambda}$$

Column 4, line 45, "as" should read -- is --. Column 5, line 25 "$\lambda$ or $\tau$" should read -- $\tau$ or $\lambda$ --; line 32, "sawtooth" should read -- saw-tooth --. Column 7, line 37, "Electronics" should read -- Electronic --. Column 8, line 13, "singals" should read -- signals --; line 29, "ratio circut" should read -- ratio circuit --.

Signed and sealed this 10th day of March 1970.

(SEAL)
Attest:

EDWARD M. FLETCHER, JR.                        WILLIAM E. SCHUYLER, JR.
Attesting Officer                                     Commissioner of Patents